(12) United States Patent
LaFrese et al.

(10) Patent No.: US 8,458,420 B2
(45) Date of Patent: Jun. 4, 2013

(54) EXECUTING HOST DATA TRANSFER OPERATIONS DURING SETUP OF COPY SERVICES OPERATIONS

(75) Inventors: Lee Charles LaFrese, Tucson, AZ (US); Christopher Michael Sansone, Tucson, AZ (US); Dana Fairbairn Scott, Tucson, AZ (US); Yan Xu, Tucson, AZ (US); Olga Yiparaki, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 12/194,152

(22) Filed: Aug. 19, 2008

(65) Prior Publication Data

US 2010/0049925 A1 Feb. 25, 2010

(51) Int. Cl.
*G06F 12/00* (2006.01)

(52) U.S. Cl.
USPC .............. 711/162; 711/114; 711/E12.103

(58) Field of Classification Search
USPC .............................. 711/162, 114, E12.103
See application file for complete search history.

(56) References Cited

U.S. PATENT DOCUMENTS

| 5,379,412 | A | * | 1/1995 | Eastridge et al. ............ 711/162 |
| 6,212,531 | B1 | | 4/2001 | Blea et al. |
| 6,618,794 | B1 | | 9/2003 | Sicola et al. |
| 6,795,904 | B1 | * | 9/2004 | Kamvysselis ................ 711/162 |
| 6,848,021 | B2 | * | 1/2005 | Segev et al. .................. 711/113 |
| 2003/0028723 | A1 | | 2/2003 | Segev et al. |
| 2004/0030837 | A1 | * | 2/2004 | Geiner et al. ................ 711/133 |
| 2004/0243892 | A1 | | 12/2004 | McBride et al. |
| 2005/0240584 | A1 | | 10/2005 | Patterson et al. |
| 2006/0143412 | A1 | * | 6/2006 | Armangau .................... 711/162 |
| 2006/0294332 | A1 | | 12/2006 | McClure et al. |
| 2007/0192454 | A1 | | 8/2007 | Blea et al. |
| 2007/0260830 | A1 | | 11/2007 | Faibish et al. |
| 2008/0010424 | A1 | | 1/2008 | Morita |
| 2009/0182960 | A1 | * | 7/2009 | Crockett et al. ............. 711/162 |

FOREIGN PATENT DOCUMENTS

| CN | 101055576 A | 10/2007 |
| JP | 2006134204 A | 5/2006 |
| JP | 2006260355 A | 9/2006 |

OTHER PUBLICATIONS

English Abstract of Japanese patent JP2006134204A.
English Abstract of Japanese patent JP2006260355A.
English Abstract of Chinese patent CN101055576A.
English translation of Japanese patent JP2006260355A.
English translation of Japanese patent JP2006134204A.

* cited by examiner

*Primary Examiner* — Reginald Bragdon
*Assistant Examiner* — Larry Mackall
(74) *Attorney, Agent, or Firm* — Rabindranath Dutta; Konrad Raynes Davda & Victor LLP (57) ABSTRACT

Host input/output (I/O) operations are performed via a file stored in a non-volatile storage coupled to a storage controller while data structures are being generated in the storage controller to copy data from source logical volumes to target logical volumes. The source logical volumes and the target logical volumes are logical representations of physical storage maintained in a plurality of direct access storage devices. The contents of the file are transferred from the non-volatile storage to one or more of the plurality of direct access storage devices, after the data structures have been generated, wherein the host I/O operations are performed via the file while the contents of the file are being transferred to the one or more of the plurality of direct access storage devices. The host I/O operations to the plurality of direct access storage devices are resumed, in response to transferring entire contents of the file to the one or more of the plurality of direct access storage devices.

20 Claims, 7 Drawing Sheets

EXECUTING HOST DATA TRANSFER OPERATIONS DURING SETUP OF COPY SERVICES OPERATIONS

BACKGROUND

1. Field

The disclosure relates to a method, system, and article of manufacture for executing host data transfer operations during setup of copy services operations.

2. Background

Physical storage, such as disks, may be coupled to a storage controller. The storage controller may represent the physical storage as a plurality of logical storage volumes. Additionally, the storage controller may be capable of executing certain copy services operations to copy source logical storage volumes to target logical storage volumes, wherein the source and target logical storage volumes are included in the plurality of logical storage volumes.

A host coupled to the storage controller may generate a request to the storage controller to copy selected source logical storage volumes to selected target logical volumes. In response to receiving the request from the host, the storage controller may copy the selected source logical volumes to the selected target logical storage volumes.

Additionally, the host may perform input/output (I/O) operations with respect to the logical storage volumes. The host may transmit write requests to the storage controller to write data to selected logical storage volumes and may transmit read requests to the storage controller to read data from selected logical storage volumes.

SUMMARY OF THE DESCRIBED EMBODIMENTS

Provided are a method, system, and article of manufacture, wherein host input/output (I/O) operations are performed via a file stored in a non-volatile storage coupled to a storage controller while data structures are being generated in the storage controller to copy data from source logical volumes to target logical volumes. The source logical volumes and the target logical volumes are logical representations of physical storage maintained in a plurality of direct access storage devices. The contents of the file are transferred from the non-volatile storage to one or more of the plurality of direct access storage devices, after the data structures have been generated, wherein the host I/O operations are performed via the file while the contents of the file are being transferred to the one or more of the plurality of direct access storage devices. The host I/O operations to the plurality of direct access storage devices are resumed, in response to transferring entire contents of the file to the one or more of the plurality of direct access storage devices.

In certain embodiments, the copying of the data from the source logical volumes to the target logical volumes is performed by a copy services operation. A determination is made that a copy services setup is active. In response to a read request from the host for selected data, the selected data is returned from the file in the non-volatile storage if the file includes the selected data. Additionally, in response to a read request from the host for the selected data, the selected data is returned from a selected direct access storage device if the file does not include the selected data.

In certain additional embodiments, a write request is received from the host to write the selected data, subsequent to determining that the copy services setup is active. The selected data is written to the file in the non-volatile storage.

In further embodiments, the contents of the file are transferred asynchronously to the one or more direct access storage devices, wherein: (i) the host is coupled to the storage controller; (ii) the non-volatile storage coupled to the storage controller is of a lesser storage capacity than the plurality of direct access storage devices, wherein the non-volatile storage has a response time that is equal to or faster than the response time of the plurality of direct access storage devices; and (iii) the plurality of direct access storage devices are coupled to the storage controller, and in response to the copy services setup not being active and the file in non-volatile storage being empty, the host I/O operations are performed with respect to the plurality of direct access storage devices.

In yet further embodiments, if data for a track is stored in the file and a new write I/O operation from the host is received at the storage controller while the file is being emptied by transferring the data for the track to the plurality of direct access storage devices, then already received write I/O operations are written to the file before the new write is processed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Copy Services Operations and Host I/O Operations

Copy services operations may be executed to establish a copy services relationship between source and target logical storage volumes. Source logical storage volumes are copied to target logical storage volumes, in response to the establishment of the copy services relationship. However, there is a time period during which all host I/O activity to the logical storage volumes associated with the copy services relationship is halted in order to generate the data structures needed to manage the copy services operations. Once the generation of the data structures is completed, the host I/O operations are released from hold and allowed to resume processing.

The halting of host I/O operations may be an undesirable side effect of attempting to establish the copy services relationship. Depending on the copy services configuration, the duration of the generation time for exemplary data structures may vary from a fraction of a second to tens of seconds. This may have a negative impact on applications that are unable to tolerate host I/O delays.

Certain embodiments provide a mechanism to perform a copy services setup for a storage system without putting host I/O operations on hold. Instead of putting host I/O operations on hold, certain embodiments use a side file in a non-volatile storage to hold the host data while the data structures are being generated for establishing copy services relationships. Data written by the host to logical storage volumes is stored in the side file on the non-volatile storage until the data structures are generated. In response to a read request from the host, the side file stored in the non-volatile storage is checked for the presence of the requested data before the storage volumes stored in the direct access storage device are checked, in order to ensure that the most current copy of the data requested via the read request is returned to the host.

Once the generation of the data structures is complete, the data that was received from the host during the generation of the data structures is moved from the side file to direct access storage devices. While the side file is being emptied, new requests from the host may be satisfied first by the side file. Once the side file has been emptied, host I/O operations are performed with respect to the direct access storage devices.

Exemplary Embodiments

Figure 1:
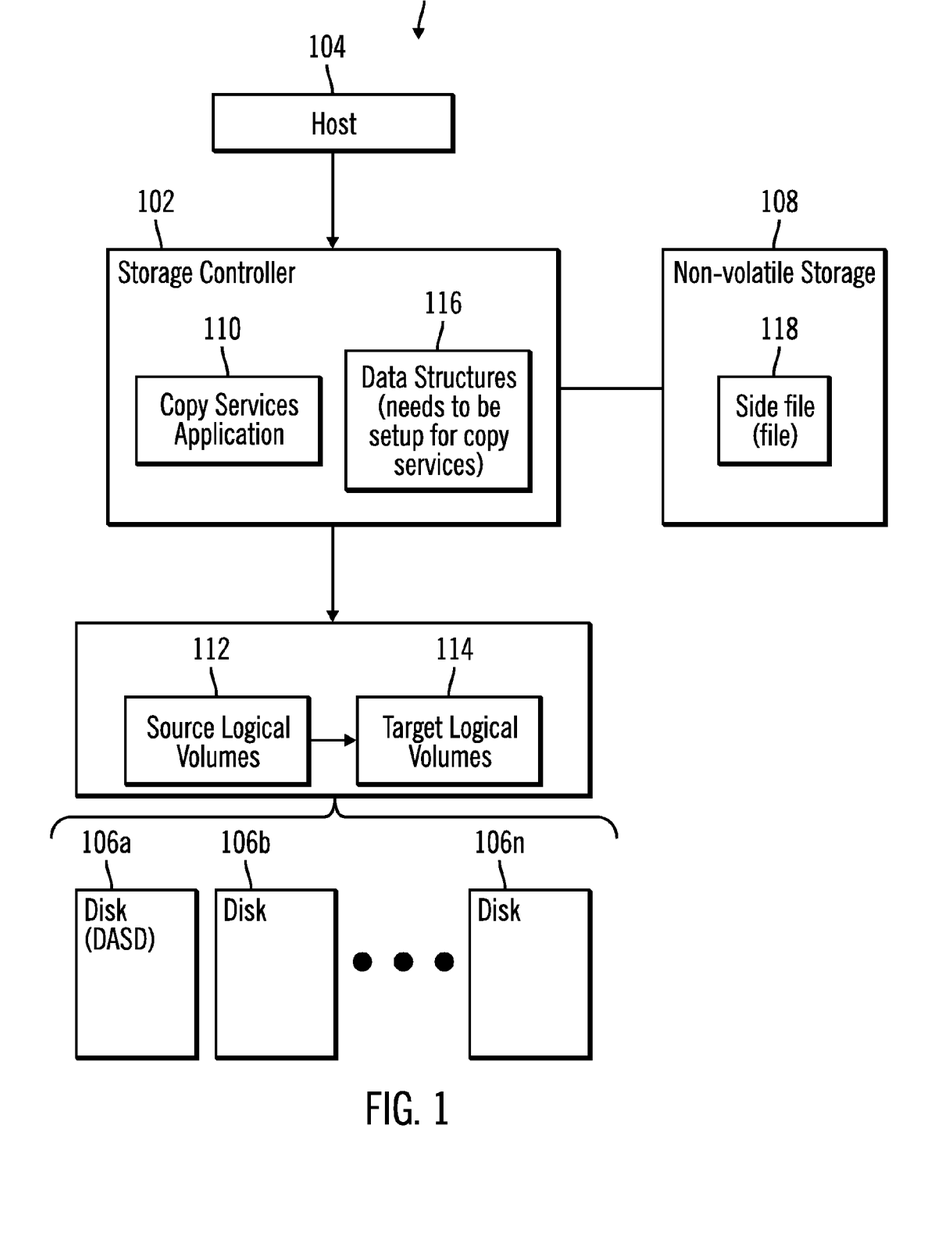
FIG. 1 illustrates a block diagram of a computing environment, in accordance with certain embodiments.

FIG. 1 illustrates a block diagram of a computing environment 100 in accordance with certain embodiments. In the computing environment 100, a storage controller 102 is coupled to a host 104 and a plurality of direct access storage devices (DASD) 106a, 106b, . . . , 106n. Additionally, the storage controller 102 is coupled to a non-volatile storage 108.

In certain embodiments, the storage controller 102 and the host 104 may be any suitable device including those presently known in the art, such as, a personal computer, a workstation, a server, a mainframe, a hand held computer, a palm top computer, a telephony device, a network appliance, a blade computer, a storage server, etc. The direct access storage devices 106a . . . 106n may in certain embodiments be disks, but in alternative embodiments the direct access storage devices 106a . . . 106n may be some other type of physical storage, such as, tapes.

The non-volatile storage 108 coupled to the storage controller 102 is of a lesser storage capacity than the plurality of direct access storage devices 106a . . . 106n, wherein the non-volatile storage 108 has a response time that is equal to or faster than the response time of the plurality of direct access storage devices. For example, in certain embodiments the non-volatile storage 108 may be a battery backed random access memory (RAM) and the direct access storage devices 106a . . . 106n may be disks. While FIG. 1 shows the non-volatile storage 108 to be located outside the storage controller 102, in alternative embodiments the non-volatile storage 108 may be included inside the storage controller 102.

In certain embodiments, the storage controller 102 includes a copy services application 110 that is implemented in software, hardware, firmware or any combination thereof. The copy services application 110 may copy source logical volumes 112 to target logical volumes 114, wherein the source logical volumes 112 and the target logical volumes 114 are logical storage volumes corresponding to physical volumes maintained in the direct access storage devices 106a . . . 106n.

The copy services application 110 may establish a copy services relationship between the source logical volumes 112 and the target logical volumes 114. However, before the source logical volumes 112 can be copied to the target logical volumes 114 certain data structures 116 have to be generated in the storage controller 102. The time period during which these data structures 116 are generated is referred to as a copy services setup time.

In certain embodiments, host I/O operations (i.e., I/O operations by the host 104) are performed with respect to an exemplary file that is referred to as a side file 118, wherein the side file 118 is maintained in the non-volatile storage 108, at least during the period in which the data structures 116 are being generated. In certain embodiments any media can hold the side file 118. For example, the side file 118 may be held in a battery backed RAM, a disk drive, a tape media, or a solid state device. After the data structures 116 are generated the side file 118 is emptied to one or more direct access storage devices that are included in the plurality of direct access storage devices 106a . . . 106n. During the period in which the side file 118 is being emptied host I/O operations are first performed with respect to the side file 118. After the side file 118 is emptied host I/O operations are performed with respect to the direct access storage devices 106a . . . 106n. Therefore, in certain embodiments host I/O operations do not have to be put on hold during the copy services setup time.

Figure 2:
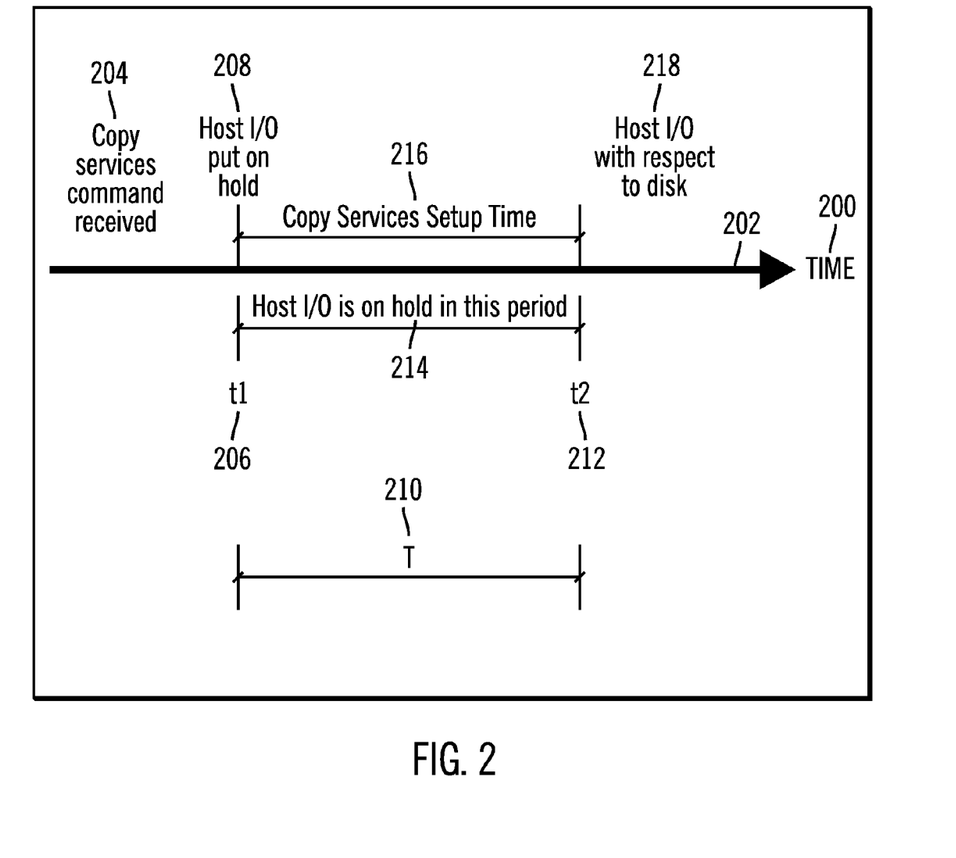
FIG. 2 illustrates a diagram that shows how host I/O operations are put on hold, in accordance with certain embodiments.
Figure 3:
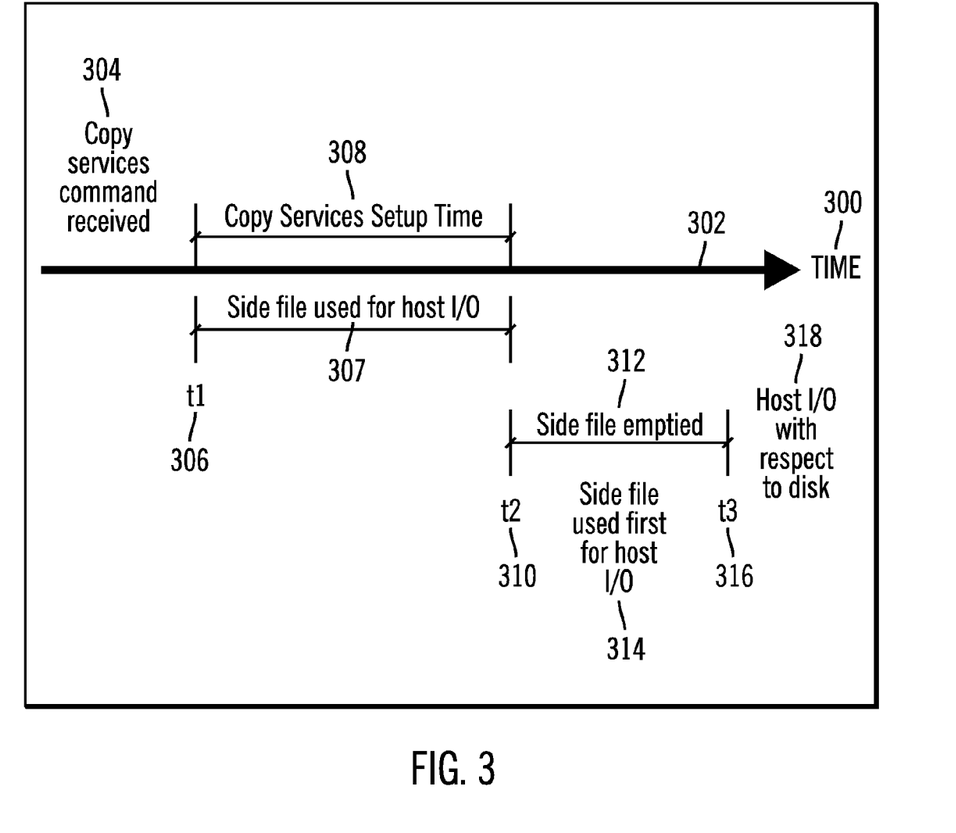
FIG. 3 illustrates a diagram that shows how a side file is used for host I/O operations, in accordance with certain embodiments.

FIG. 2 illustrates a diagram that shows how host I/O operations are put on hold during a period in which copy services are being set up, in accordance with certain embodiments in which the side file 118 is not used. In FIG. 2, the passage of time 200 is shown by the arrow 202, wherein time increases in the direction indicated by the arrow 202. A copy services command 204 is received before the time t1 206. On receiving the copy services command 204, host I/O is put on hold (reference numeral 208) for the duration of the time period T 210 that occurs between time t1 206 and time t2 212. Therefore, FIG. 3 shows that host I/O is on hold (reference numeral 214) during the time period T 210 that is the copy services setup time 216. During the copy services setup time 216, the data structures 116 (shown in FIG. 1) may be generated and the host I/O is put on hold. FIG. 2 also illustrates that host I/O with respect to the disks 106a . . . 106n can resume (reference numeral 218) after the completion of the copy services setup at time t2 212.

Therefore, FIG. 2 shows that in embodiments in which the side file 118 is not used, host I/O may have to be put on hold during the copy services setup time 216.

FIG. 3 illustrates a diagram that shows how the side file 118 is used for host I/O in accordance with certain embodiments. In FIG. 3, the passage of time 300 is shown by the arrow 302, wherein time increases in the direction indicated by the arrow 302. A copy services command 304 is received before the time t1 306. On receiving the copy services command 304, the side file 118 is used for host I/O operations (reference numeral 307) during the copy services setup time 308, wherein during the copy services setup time 308 the data structures 116 (shown in FIG. 1) are being generated. The generation of the data structures 116 includes the setup of the data structures 116. At time t2 310 the copy services setup is completed and the side file 118 is emptied (reference numeral 312). The side file 118 is used first for host I/O operations (reference numeral 314) until the side file 118 is completely emptied at time t3 316. At time t3 316 host I/O with respect to the disks 106a . . . 106n can resume (reference numeral 318).

Therefore FIG. 3 shows certain embodiments in which a side file 118 is used for host I/O in order to prevent the host I/O from being put on hold while copy services setup is completed. During the copy services setup time 308, certain embodiments may choose to only store those tracks affected by the copy services action in the side file 118, whereas certain alternative embodiments may choose to store all writes to and reads from the direct access storage devices 106a . . . 106n in the side file 118.

Figure 4:
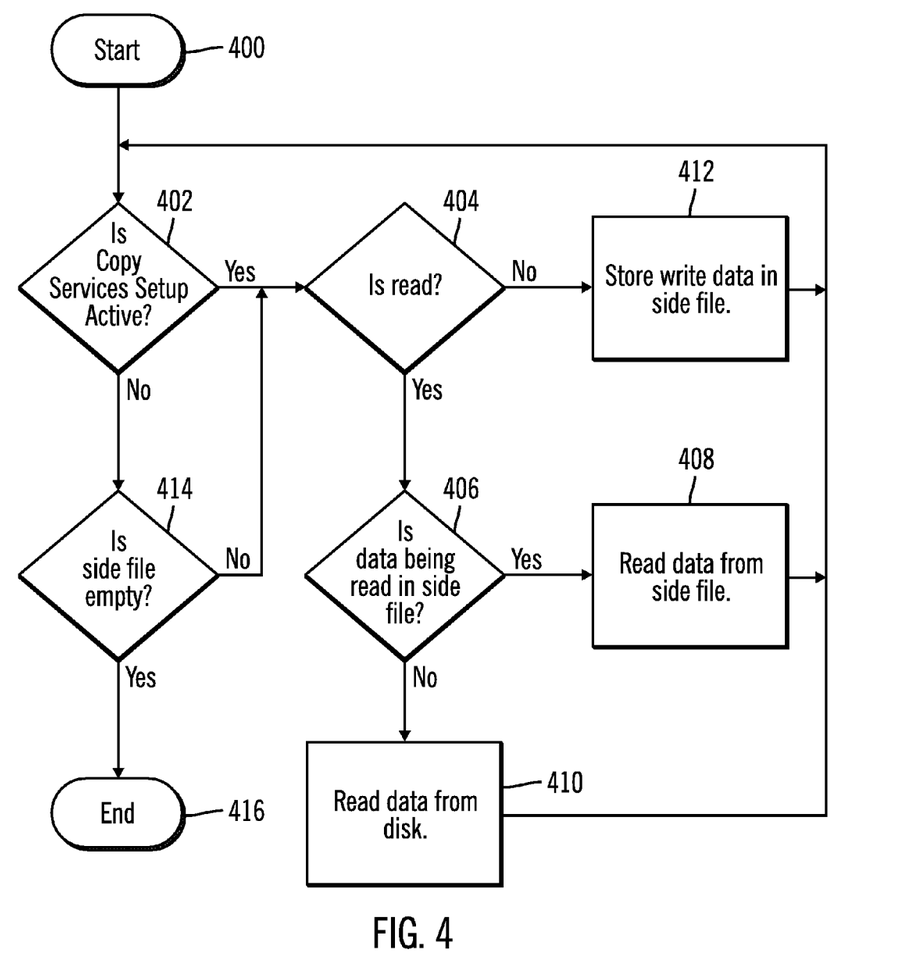
FIG. 4 illustrates a flowchart that shows first operations, in accordance with certain embodiments.

FIG. 4 illustrates a flowchart that shows first operations, in accordance with certain embodiments. The first operations may be implemented in certain embodiments in the storage controller 102 of the computing environment 100, and the first operations may be performed by the copy services application 110 included in the storage controller 102.

Control starts at block 400 and proceeds to block 402 in which the copy services application 110 determines whether copy services setup is active. Copy services setup is active when the storage controller 102 has received a command to establish a copy services relationship and has started executing the command. During the period in which the copy services setup is active the data structures 116 are generated so that copy operations can take place from the source logical volumes 112 to the target logical volumes 114.

If the copy services application 110 determines (at block 402) that the copy services setup is active, then control proceeds to block 404 in which the copy services application 110 in response to receiving a request from the host 104 determines whether the request is a read request. If so, then the copy services application 110 determines (at block 406) whether the data requested by the read request is present in the side file 118. If the copy services application 110 determines that the data requested by the read request is present in the side file 118, then the copy services application 110 reads (at block 408) the data from the side file 118 and sends the data to the host 104. If the copy services application 110 determines (at block 406) that the data requested by the read request is not present in the side file 118, then the copy services application 110 reads (at block 410) the data from one or more of the direct access storage devices 106a . . . 106n and sends the data to the host 104. Therefore, the copy services application 110 first attempts to determine whether requested data is present in the side file 118 or not. If the requested data is present in the side file 118 then the requested data is read from the side file 118, otherwise the data is retrieved from the direct access storage devices 106a . . . 106n.

If at block 404, the copy services application 110 determines that the storage controller 102 has not received a read request from the host 104, then in certain embodiments the copy services application 110 may determine that the request received from the host is a write request and the copy services application 110 may store (at block 412) the data that is requested to be written by the write request in the side file 118. Therefore, write data from the host is written in the side file 118 while the copy services setup is active.

If at block 402, the copy services application 110 determines that the copy services setup is no longer active (i.e., the generation of all the data structures 116 has been completed) then control proceeds to block 414 in which the copy services application 110 determines whether the side file 118 is empty. If so, control stops (at block 416). If not, control returns to block 404 in which a determination is made as to whether a request from the host 104 is a read request. Therefore, while the side file 118 is being emptied (as shown by reference numeral 312 in FIG. 3) the side file 118 is used first to respond to read requests, and write data of write requests are written to the side file 118.

Therefore, FIG. 4 illustrates certain embodiments in which the copying of the data from source logical volumes 112 to target logical volumes 114 is performed by a copy services operation. A determination is made that a copy services setup is active. In response to a read request from the host 104 for selected data, the selected data is returned from a file (e.g., the side file 118) in the non-volatile storage 106 if the file includes the selected data. Additionally, in response to a read request from the host 104 for the selected data, the selected data is returned from a selected direct access storage device (e.g., one or more of the direct access storage devices 106a . . . 106n) if the file does not include the selected data.

Figure 5:
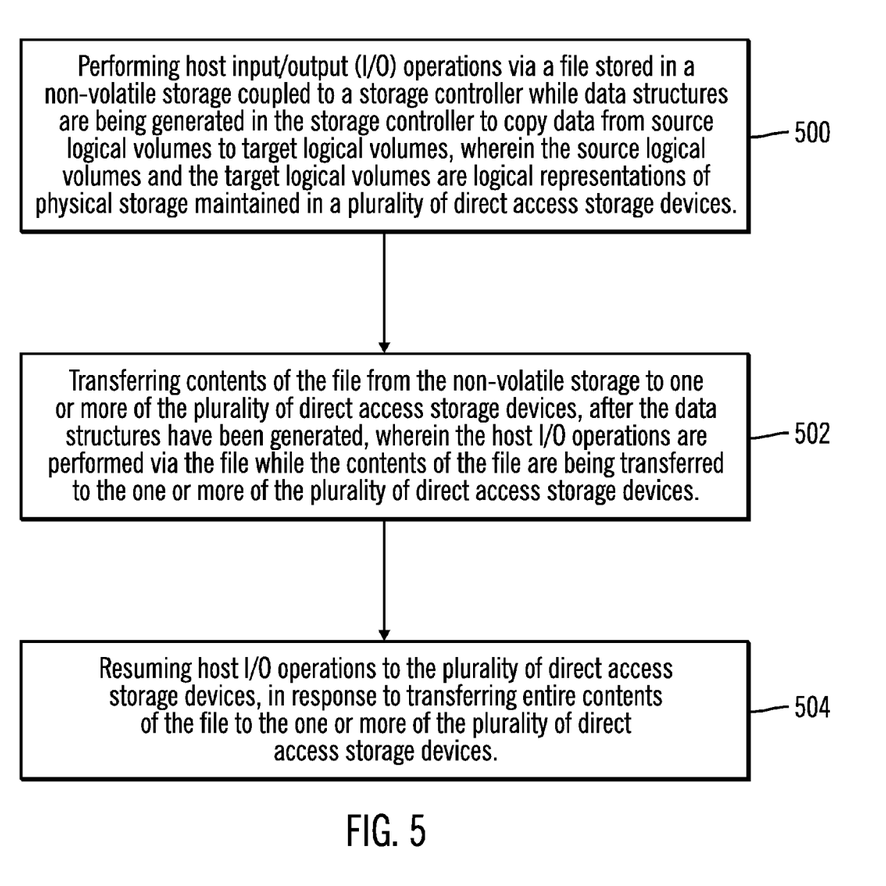
FIG. 5 illustrates a flowchart that shows second operations, in accordance with certain embodiments.

FIG. 5 illustrates a flowchart that shows second operations, in accordance with certain embodiments. The second operations may be implemented in certain embodiments in the storage controller 102 of the computing environment 100, and the second operations may be performed by the copy services application 110 included in the storage controller 102.

Control starts at block 500 in which host input/output (I/O) operations are performed via a file 118 stored in a non-volatile storage 108 coupled to a storage controller 102 while data structures 116 are being generated in the storage controller 102 to copy data from source logical volumes 112 to target logical volumes 114. The source logical volumes 112 and the target logical volumes 114 are logical representations of physical storage maintained in a plurality of direct access storage devices 106a . . . 106n.

Control proceeds to block 502 in which the contents of the file 118 are transferred from the non-volatile storage 108 to one or more of the plurality of direct access storage devices 106a . . . 106n, after the data structures 116 have been generated, wherein the host I/O operations are performed via the file 118 while contents of the file 118 are being transferred to the one or more of the plurality of direct access storage devices 106a . . . 106n.

From block 502, control proceeds to block 504 in which the host I/O operations to the plurality of direct access storage devices 106a . . . 106n are resumed, in response to transferring entire contents of the file 118 to the one or more the plurality of direct access storage devices 106a . . . 106n.

Figure 6:
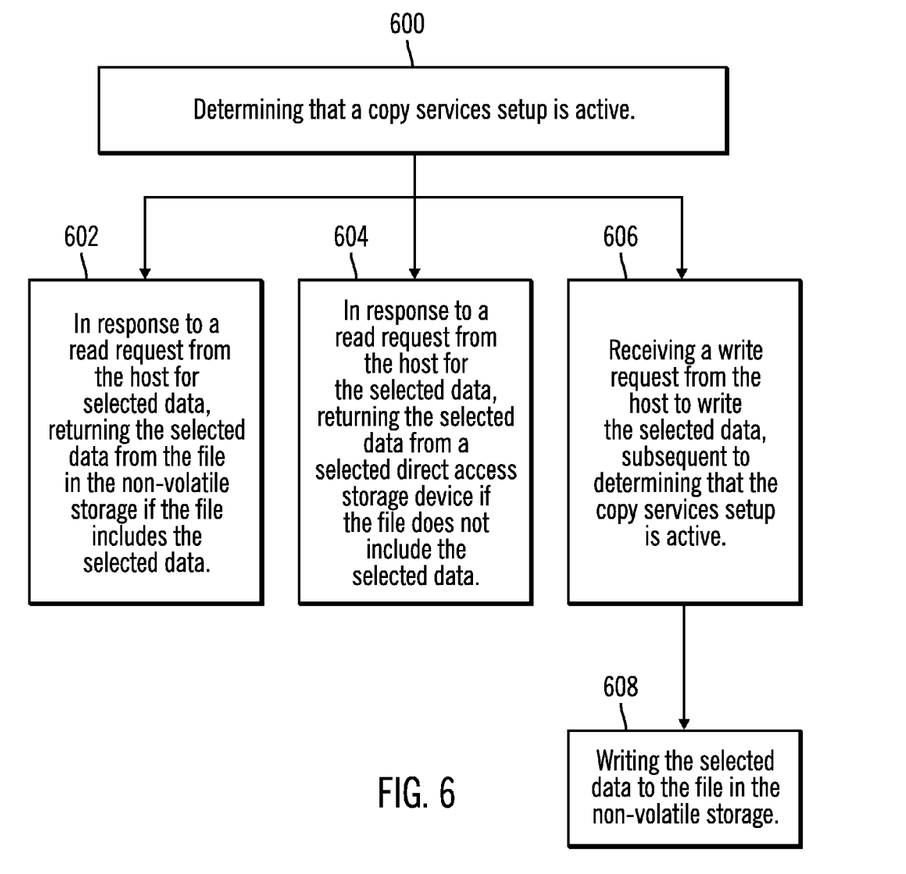
FIG. 6 illustrates a flowchart that shows third operations, in accordance with certain embodiments.

FIG. 6 illustrates a flowchart that shows third operations, in accordance with certain embodiments. The third operations may be implemented in certain embodiments in the storage controller 102 of the computing environment 100, and the third operations may be performed by the copy services application 110 included in the storage controller 102.

Control starts at block 600, in which the copy services application 110 determines that a copy services setup is active. From block 600 control may proceed in parallel to blocks 602, 604, and 606.

At block 602, in response to a read request from the host 104 for selected data, the copy services application 110 returns the selected data requested by the host 104 from the file 118 in the non-volatile storage 108 if the file 118 includes the selected data. Additionally, in response to a read request from the host 104 for the selected data, the copy services application 110 returns (at block 604) the selected data from a selected direct access storage device (e.g., one or more direct access storage devices found in the plurality of direct access storage devices 106a . . . 106n) if the file 118 does not include the selected data.

At block 606, the copy services application 110 receives a write request from the host 104 to write selected data, subsequent to determining that the copy services setup is active. The copy services application 110 writes (at block 608) the selected data to the file 118 in the non-volatile storage 108.

Therefore, FIG. 6 illustrates certain embodiments in which the copy services application 110 responds to read requests from the file 118 before accessing the direct access storage devices 106a . . . 106n if the copy services setup is active. Additionally the copy services application 110 responds to write requests by writing data to the file 118 if the copy services setup is active.

In certain embodiments, after the copy services setup is complete any updated tracks in the side file 118 may be moved asynchronously to the disks 106a . . . 106n. While the side file 118 is being emptied, new requests from the host 104 may have to be satisfied by the side file 118. This is done to maintain data consistency. For example, if data for a track is stored in the side file 118 and a new write arrives at a direct access storage device 106a while the side file 118 is being emptied, then the data in the side file 118 may have to be written before the new write is processed. By enforcing the data sequencing, certain embodiments ensure that writes occur in the correct order. When the side file 118 is empty, normal I/O operations to the disks 106a . . . 106n may resume.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine, such as a processor or a computer, results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
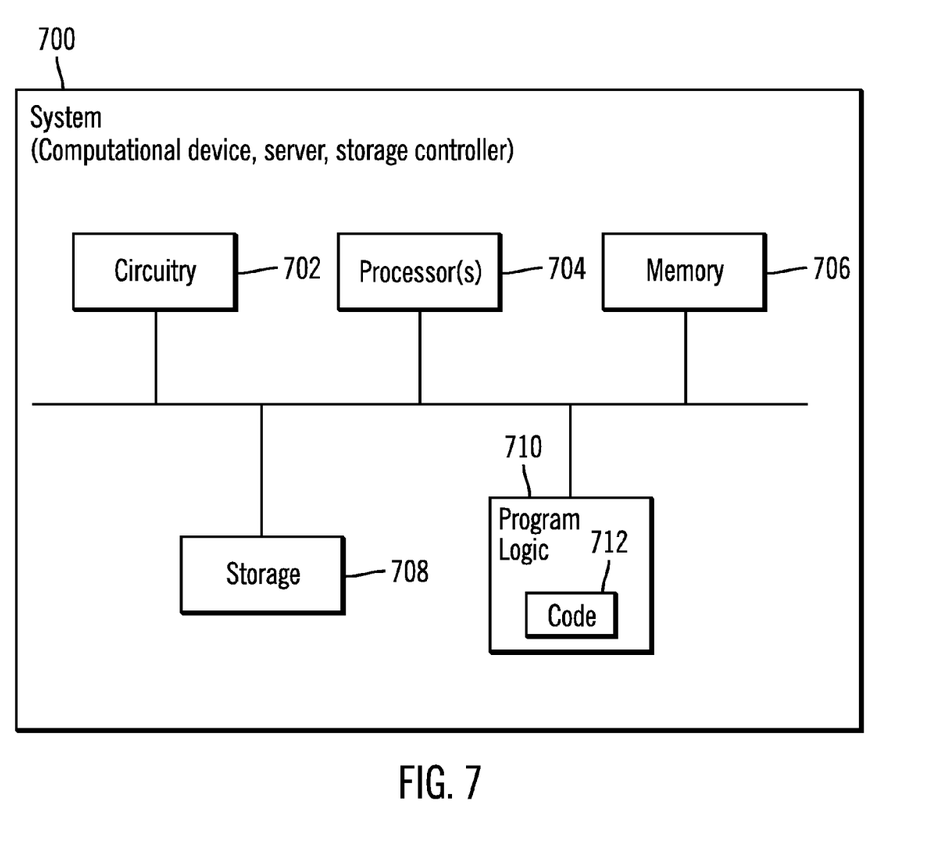
FIG. 7 illustrates the architecture of computing system, wherein in certain embodiments elements of the computing environment of FIG. 1 may be implemented in accordance with the architecture of the computing system.

FIG. 7 illustrates an exemplary computer system 700, wherein in certain embodiments the host 104 and the storage controller 102 of the computing environment 100 of FIG. 1 may be implemented in accordance with the computer architecture of the computer system 700. One or more of the hosts 104 and the storage controllers 102, either individually or collectively may also be referred to as a system 700, and may include a circuitry 702 that may in certain embodiments include a processor 704. The system 700 may also include a memory 706 (e.g., a volatile memory device), and storage 708. The storage 708 may include a non-volatile memory device (e.g., EEPROM, ROM, PROM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instructions or infrastructure by a person or via automated processing, wherein the method for deploying integrates computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
storing only those tracks that are affected by a copy services action in a file stored in a non volatile storage coupled to a storage controller during a copy services setup time;
performing host input/output (I/O) operations via the file while data structures are being generated in the storage controller to copy data from source logical volumes to target logical volumes, wherein the source logical volumes and the target logical volumes are logical representations of physical storage maintained in a plurality of direct access storage devices;
transferring contents of the file from the non-volatile storage to one or more of the plurality of direct access storage devices, after the data structures have been generated, wherein the host I/O operations are performed via the file while the contents of the file are being transferred to the one or more of the plurality of direct access storage devices; and
resuming host I/O operations to the plurality of direct access storage devices, in response to transferring entire contents of the file to the one or more of the plurality of direct access storage devices, wherein copying of the data from the source logical volumes to the target logical volumes is performed by a copy services operation, the method further comprising:
in response to determining that a copy services setup is active, performing: in response to a read request from the host for selected data, returning the selected data from the file if the file includes the selected data; and
in response to determining that the copy services setup is not active, performing: determining whether the file is empty, and in response to determining that the file is not empty, in response to the read request from the host for the selected data, returning the selected data from the file if the file includes the selected data.

2. The method of claim 1, the method further comprising:
receiving a write request from the host to write the selected data, subsequent to determining that the copy services setup is active; and
writing the selected data to the file in the non-volatile storage.

3. The method of claim 1, wherein the contents of the file are transferred asynchronously to the one or more direct access storage devices, and wherein:
(i) the host is coupled to the storage controller;
(ii) the non-volatile storage coupled to the storage controller is of a lesser storage capacity than the plurality of direct access storage devices, wherein the non-volatile storage has a response time that is equal to or faster than the response time of the plurality of direct access storage devices; and
(iii) the plurality of direct access storage devices are coupled to the storage controller, and in response to the copy services setup not being active and the file in non-volatile storage being empty, the host I/O operations are performed with respect to the plurality of direct access storage devices.

4. The method of claim 1, wherein not all writes to the plurality of direct access storage devices are stored in the file, and wherein the non volatile storage is a battery backed random access memory that is located outside the storage controller.

5. The method of claim 1, wherein in response to determining that a copy services setup is active further performing:
in response to the read request from the host for the selected data, returning the selected data from a selected direct access storage device if the file does not include the selected data; and
in response to a write request from the host, storing write data in the file.

6. A system, comprising:
a memory; and
a processor coupled to the memory, wherein the processor performs operations, the operations comprising:
storing only those tracks that are affected by a copy services action in a file stored in a non volatile storage coupled to a storage controller during a copy services setup time;
performing host input/output (I/O) operations via the file while data structures are being generated in the storage controller to copy data from source logical volumes to target logical volumes, wherein the source logical volumes and the target logical volumes are logical representations of physical storage maintained in a plurality of direct access storage devices;

transferring contents of the file from the non-volatile storage to one or more of the plurality of direct access storage devices, after the data structures have been generated, wherein the host I/O operations are performed via the file while the contents of the file are being transferred to the one or more of the plurality of direct access storage devices; and resuming host I/O operations to the plurality of direct access storage devices, in response to transferring entire contents of the file to the one or more of the plurality of direct access storage devices, wherein copying of the data from the source logical volumes to the target logical volumes is performed by a copy services operation, the operations further comprising:

in response to determining that a copy services setup is active, performing: in response to a read request from the host for selected data, returning the selected data from the file if the file includes the selected data; and in response to determining that the copy services setup is not active, performing: determining whether the file is empty, and in response to determining that the file is not empty, in response to the read request from the host for the selected data, returning the selected data from the file if the file includes the selected data.

7. The system of claim 6, the operations further comprising:

receiving a write request from the host to write the selected data, subsequent to determining that the copy services setup is active; and writing the selected data to the file in the non-volatile storage.

8. The system of claim 6, wherein the contents of the file are transferred asynchronously to the one or more direct access storage devices, and wherein:

(i) the host is coupled to the storage controller;

(ii) the non-volatile storage coupled to the storage controller is of a lesser storage capacity than the plurality of direct access storage devices, wherein the non-volatile storage has a response time that is equal to or faster than the response time of the plurality of direct access storage devices; and (iii) the plurality of direct access storage devices are coupled to the storage controller, and in response to the copy services setup not being active and the file in non-volatile storage being empty, the host I/O operations are performed with respect to the plurality of direct access storage devices.

9. The system of claim 6, wherein not all writes to the plurality of direct access storage devices are stored in the file, and wherein the non volatile storage is a battery backed random access memory that is located outside the storage controller.

10. The system of claim 6, wherein in response to determining that a copy services setup is active further performing:

in response to the read request from the host for the selected data, returning the selected data from a selected direct access storage device if the file does not include the selected data; and in response to a write request from the host, storing write data in the file.

11. A computer readable storage medium, wherein code stored in the computer readable storage medium when executed by a processor causes operations to be performed, the operations comprising:

storing only those tracks that are affected by a copy services action in a file stored in a non volatile storage coupled to a storage controller during a copy services setup time;

performing host input/output (I/O) operations via the file while data structures are being generated in the storage controller to copy data from source logical volumes to target logical volumes, wherein the source logical volumes and the target logical volumes are logical representations of physical storage maintained in a plurality of direct access storage devices;

transferring contents of the file from the non-volatile storage to one or more of the plurality of direct access storage devices, after the data structures have been generated, wherein the host I/O operations are performed via the file while the contents of the file are being transferred to the one or more of the plurality of direct access storage devices; and resuming host I/O operations to the plurality of direct access storage devices, in response to transferring entire contents of the file to the one or more of the plurality of direct access storage devices, wherein copying of the data from the source logical volumes to the target logical volumes is performed by a copy services operation, the operations further comprising:

in response to determining that a copy services setup is active, performing: in response to a read request from the host for selected data, returning the selected data from the file if the file includes the selected data; and in response to determining that the copy services setup is not active, performing: determining whether the file is empty, and in response to determining that the file is not empty, in response to the read request from the host for the selected data, returning the selected data from the file if the file includes the selected data.

12. The computer readable storage medium of claim 11, the operations further comprising:

receiving a write request from the host to write the selected data, subsequent to determining that the copy services setup is active; and writing the selected data to the file in the non-volatile storage.

13. The computer readable storage medium of claim 11, wherein the contents of the file are transferred asynchronously to the one or more direct access storage devices, and wherein:

(i) the host is coupled to the storage controller;

(ii) the non-volatile storage coupled to the storage controller is of a lesser storage capacity than the plurality of direct access storage devices, wherein the non-volatile storage has a response time that is equal to or faster than the response time of the plurality of direct access storage devices; and (iii) the plurality of direct access storage devices are coupled to the storage controller, and in response to the copy services setup not being active and the file in non-volatile storage being empty, the host I/O operations are performed with respect to the plurality of direct access storage devices.

14. The computer readable storage medium of claim 11, wherein not all writes to the plurality of direct access storage devices are stored in the file, and wherein the non volatile storage is a battery backed random access memory that is located outside the storage controller.

15. The computer readable storage medium of claim 11, wherein in response to determining that a copy services setup is active further performing:

in response to the read request from the host for the selected data, returning the selected data from a selected direct access storage device if the file does not include the selected data; and in response to a write request from the host, storing write data in the file.

16. A method for deploying computing infrastructure, comprising integrating computer-readable code into a computing system, wherein the code in combination with the computing system is capable of performing:

storing only those tracks that are affected by a copy services action in a file stored in a non volatile storage coupled to a storage controller during a copy services setup time;

performing host input/output (I/O) operations via the file while data structures are being generated in the storage controller to copy data from source logical volumes to target logical volumes, wherein the source logical volumes and the target logical volumes are logical representations of physical storage maintained in a plurality of direct access storage devices;

transferring contents of the file from the non-volatile storage to one or more of the plurality of direct access storage devices, after the data structures have been generated, wherein the host I/O operations are performed via the file while the contents of the file are being transferred to the one or more of the plurality of direct access storage devices; and resuming host I/O operations to the plurality of direct access storage devices, in response to transferring entire contents of the file to the one or more of the plurality of direct access storage devices, wherein copying of the data from the source logical volumes to the target logical volumes is performed by a copy services operation, wherein the code in combination with the computing system is further capable of performing:

in response to determining that a copy services setup is active, performing: in response to a read request from the host for selected data, returning the selected data from the file if the file includes the selected data; and in response to determining that the copy services setup is not active, performing: determining whether the file is empty, and in response to determining that the file is not empty, in response to the read request from the host for the selected data, returning the selected data from the file if the file includes the selected data.

17. The method for deploying computing infrastructure of claim 16, wherein the code in combination with the computing system is further capable of performing:

receiving a write request from the host to write the selected data, subsequent to determining that the copy services setup is active; and writing the selected data to the file in the non-volatile storage.

18. The method for deploying computing infrastructure of claim 16, wherein the contents of the file are transferred asynchronously to the one or more direct access storage devices, and wherein:

(i) the host is coupled to the storage controller;

(ii) the non-volatile storage coupled to the storage controller is of a lesser storage capacity than the plurality of direct access storage devices, wherein the non-volatile storage has a response time that is equal to or faster than the response time of the plurality of direct access storage devices; and (iii) the plurality of direct access storage devices are coupled to the storage controller, and in response to the copy services setup not being active and the file in non-volatile storage being empty, the host I/O operations are performed with respect to the plurality of direct access storage devices.

19. The method for deploying computing infrastructure of claim 16, wherein not all writes to the plurality of direct access storage devices are stored in the file, and wherein the non volatile storage is a battery backed random access memory that is located outside the storage controller.

20. The method for deploying computing infrastructure of claim 16, wherein in response to determining that a copy services setup is active further performing:

in response to the read request from the host for the selected data, returning the selected data from a selected direct access storage device if the file does not include the selected data; and in response to a write request from the host, storing write data in the file.

* * * * *